United States Patent
Kuo et al.

(10) Patent No.: US 11,812,005 B2
(45) Date of Patent: *Nov. 7, 2023

(54) USER-PREFERRED REPRODUCTION OF OUT-OF-GAMUT SPOT COLORS

(71) Applicant: Eastman Kodak Company, Rochester, NY (US)

(72) Inventors: Chung-Hui Kuo, Fairport, NY (US); Victor Ignacio Ibarluzea, Brockport, NY (US); Thomas L. Schwartz, Fairport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,079

(22) Filed: Jun. 28, 2022

(65) Prior Publication Data

US 2023/0133375 A1    May 4, 2023

Related U.S. Application Data

(60) Provisional application No. 63/273,248, filed on Oct. 29, 2021.

(51) Int. Cl.
    *H04N 1/60*        (2006.01)
(52) U.S. Cl.
    CPC ......... *H04N 1/6066* (2013.01); *H04N 1/6075* (2013.01)
(58) Field of Classification Search
    CPC .. H04N 1/6066; H04N 1/6075; H04N 1/6061; H04N 1/60
    See application file for complete search history.

(56) References Cited

U.S. PATENT DOCUMENTS

| | | | |
|---|---|---|---|
| 7,079,287 B1 | 7/2006 | Ng et al. | |
| 7,097,281 B2 | 7/2006 | Ng et al. | |
| 7,239,422 B2* | 7/2007 | Braun | H04N 1/6058 358/1.9 |
| 7,583,406 B2* | 9/2009 | Spaulding | H04N 1/6058 358/1.9 |
| 7,830,569 B2 | 11/2010 | Tai et al. | |
| 8,824,907 B2 | 9/2014 | Kuo et al. | |
| 9,147,232 B1 | 9/2015 | Kuo et al. | |
| 10,062,017 B2 | 8/2018 | Kuo et al. | |

(Continued)

FOREIGN PATENT DOCUMENTS

WO    WO-2005043507 A1 *    5/2005    ............... H04N 1/60

*Primary Examiner* — Ted W Barnes
(74) *Attorney, Agent, or Firm* — David A. Novais

(57) ABSTRACT

A method for reproducing an out-of-gamut spot color includes determining a color gamut for a color printer, and specifying a spot color by color coordinates in a three-dimensional color space. A first target color is determined corresponding to a color having a minimum color difference to the specified spot color, and a second target color is determined corresponding to a color on the color gamut surface having a hue value equal to a hue value of the specified spot color. A path is defined on the color gamut surface connecting the first target color and the second target color, wherein a control parameter is used to specify a relative position along the defined path. A user interface is provided enabling a user to adjust the control parameter to specify an aim color.

16 Claims, 11 Drawing Sheets

(56) References Cited

U.S. PATENT DOCUMENTS

| | | | |
|---|---|---|---|
| 11,120,725 B2* | 9/2021 | Aly | G09G 5/005 |
| 2005/0150411 A1* | 7/2005 | Bestmann | H04N 1/54 |
| | | | 101/484 |
| 2007/0097389 A1* | 5/2007 | Morovic | H04N 1/6058 |
| | | | 358/1.9 |
| 2007/0236761 A1* | 10/2007 | Sloan | H04N 1/6058 |
| | | | 358/1.9 |
| 2009/0185201 A1* | 7/2009 | Lin | H04N 1/603 |
| | | | 358/1.9 |
| 2010/0085587 A1* | 4/2010 | Hayward | H04N 1/6033 |
| | | | 358/1.9 |
| 2010/0232693 A1* | 9/2010 | Stevens | G06T 5/009 |
| | | | 382/167 |
| 2011/0069077 A1* | 3/2011 | Chen | H04N 1/62 |
| | | | 345/589 |
| 2011/0134447 A1* | 6/2011 | Mestha | H04N 1/6058 |
| | | | 358/1.9 |
| 2014/0233914 A1* | 8/2014 | Williams | H04N 1/6052 |
| | | | 386/280 |
| 2016/0381254 A1* | 12/2016 | Poree | H04N 9/67 |
| | | | 382/167 |
| 2017/0374237 A1 | 12/2017 | Muller et al. | |
| 2022/0058840 A1* | 2/2022 | Hayami | G06T 11/001 |

* cited by examiner

FIG. 1 *(Prior Art)*

USER-PREFERRED REPRODUCTION OF OUT-OF-GAMUT SPOT COLORS

CROSS-REFERENCE TO RELATED APPLICATIONS

This application claims the benefit of U.S. Provisional Patent Application No. 63/273,248, filed Oct. 29, 2021, which is incorporated herein by reference in its entirety.

Reference is made to commonly assigned, co-pending U.S. patent application Ser. No. 17/851,081, entitled: "Reproducing out-of-gamut spot colors on a color printer," by C.-H. Kuo et al., which is incorporated herein by reference.

FIELD OF THE INVENTION

This invention pertains to the field of electrographic printing and more particularly to a method for reproducing out-of-gamut spot colors.

BACKGROUND OF THE INVENTION

Electrophotography is a useful process for printing images on a receiver (or "imaging substrate"), such as a piece or sheet of paper or another planar medium (e.g., glass, fabric, metal, or other objects) as will be described below. In this process, an electrostatic latent image is formed on a photoreceptor by uniformly charging the photoreceptor and then discharging selected areas of the uniform charge to yield an electrostatic charge pattern corresponding to the desired image (i.e., a "latent image").

After the latent image is formed, charged toner particles are brought into the vicinity of the photoreceptor and are attracted to the latent image to develop the latent image into a toner image. Note that the toner image may not be visible to the naked eye depending on the composition of the toner particles (e.g., clear toner).

After the latent image is developed into a toner image on the photoreceptor, a suitable receiver is brought into juxtaposition with the toner image. A suitable electric field is applied to transfer the toner particles of the toner image to the receiver to form the desired print image on the receiver. The imaging process is typically repeated many times with reusable photoreceptors.

The receiver is then removed from its operative association with the photoreceptor and subjected to heat or pressure to permanently fix (i.e., "fuse") the print image to the receiver. Plural print images (e.g., separation images of different colors) can be overlaid on the receiver before fusing to form a multicolor print image on the receiver.

As the digital printing technology is beginning to gain a foothold in package printing, it is imperative for the digital printing system to satisfactorily match any predefined spot color. While it is more economical for the traditional high-volume package printing process to utilize premixed inks that match the intended custom spot colors, this solution is generally not suitable for short-run package print jobs. Typically, the printing systems used for such applications (e.g., electrophotographic printing systems) use a predefined set of colorants (e.g., cyan, magenta, yellow and black toners), and it would not be economical to change the colorants for short-run print jobs. Many spot colors do not fall within the color gamut associated with the predefined set of colorants. As a result, it is necessary to reproduce the spot colors using a color which falls within the color gamut. The determination of the optimal in-gamut colors for reproducing out-of-gamut spot colors is not a trivial process. Various "gamut-mapping algorithms" have been proposed for mapping out-of-gamut colors to appropriate colors on the surface of the device color gamut. One prior art gamut mapping algorithm finds the in-gamut color having the smallest color difference to the out-of-gamut color. Such algorithms are prone to introducing objectionable hue shifts. Another prior art gamut mapping algorithm operates by clipping the chroma to the color gamut while maintaining the hue and lightness of the out-of-gamut color. Such algorithms are prone to introducing objectionable chroma reductions. As a result of these deficiencies, many users choose to manually determine a preferred aim color for out-of-gamut spot colors. This typically requires a time-consuming iterative process to determine the preferred color reproduction given the complex shape of typical color gamuts and the fact that a plurality of control parameters (e.g., hue and lightness) must be adjusted to move around on the color gamut surface. This process needs to be repeated every time a new spot color is introduced. Furthermore, the preferred aim color may be customer-dependent so that the preferred aim color determined for one customer may not be the optimal solution for a different customer.

There remains a need for a user-friendly method to determine preferred aim colors for out-of-gamut spot colors in a color printing system.

SUMMARY OF THE INVENTION

The present invention represents a method for reproducing an out-of-gamut spot color on a color printer, including:

determining a color gamut for the color printer, the color gamut being defined by a color gamut surface in a three-dimensional color space representing the colors that can be printed by the color printer;

specifying a spot color by color coordinates in the three-dimensional color space, wherein the spot color is outside of the color gamut surface;

determining a first target color corresponding to a color on the color gamut surface having a minimum color difference to the specified spot color;

determining a second target color corresponding to a color on the color gamut surface having a hue value equal to a hue value of the specified spot color;

defining a path on the color gamut surface connecting the first target color and the second target color, wherein a control parameter having a control parameter value is used to specify a relative position along the defined path; and providing a user interface enabling a user to adjust the control parameter to specify an aim color along the defined path for reproducing the spot color using the color printer.

This invention has the advantage that an aim color corresponding to a preferred reproduction of a spot color can be determined using only a single control parameter.

It has the additional advantage that a control parameter prediction function can be used to automatically compute a control parameter value that can be used to determine an initial preferred aim color.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
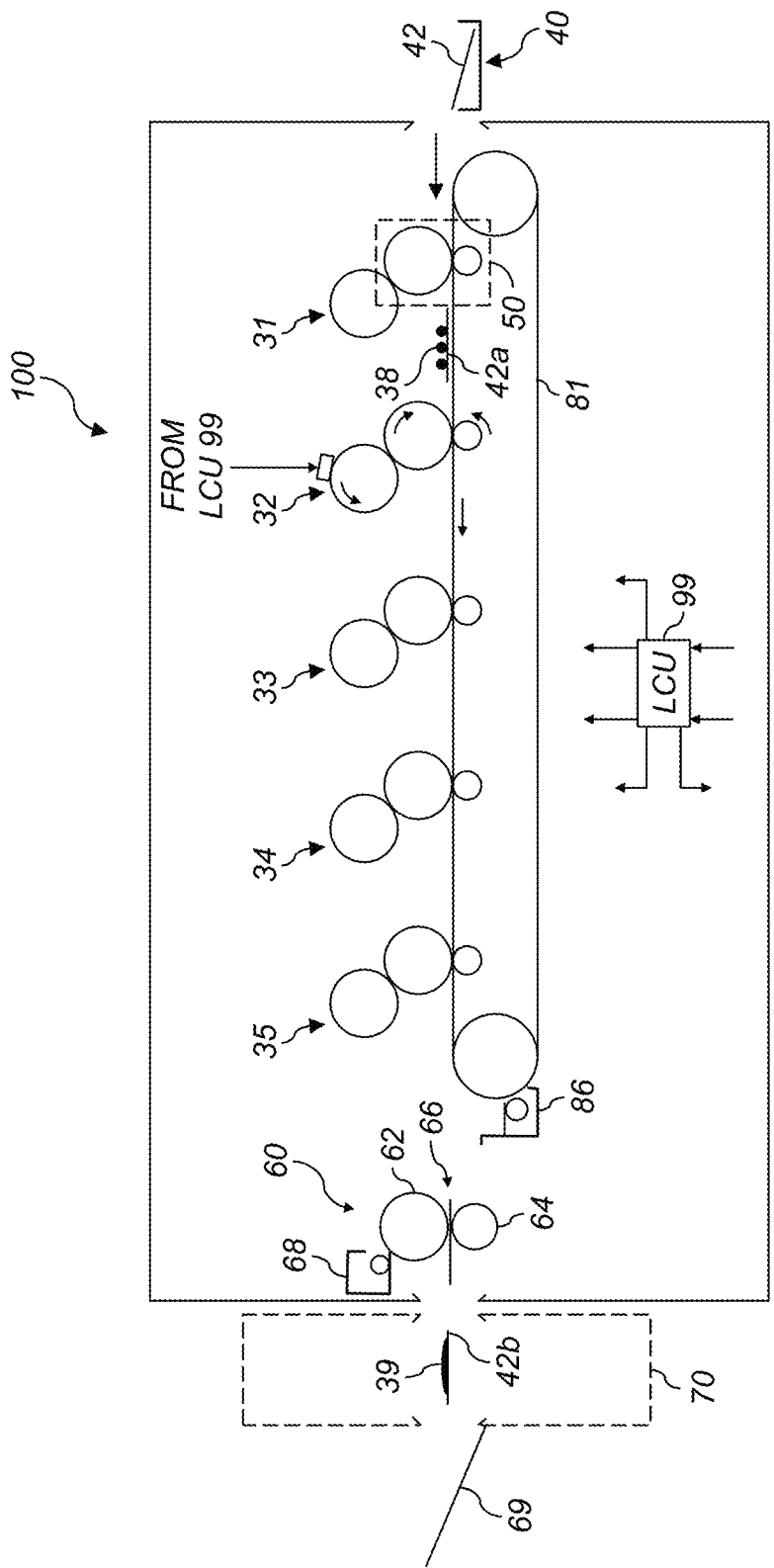
FIG. 1 is an elevational cross-section of an electrophotographic printer suitable for use with various embodiments.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated, or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

As used herein, "sheet" is a discrete piece of media, such as receiver media for an electrophotographic printer (described below). Sheets have a length and a width. Sheets are folded along fold axes (e.g., positioned in the center of the sheet in the length dimension, and extending the full width of the sheet). The folded sheet contains two "leaves," each leaf being that portion of the sheet on one side of the fold axis. The two sides of each leaf are referred to as "pages." "Face" refers to one side of the sheet, whether before or after folding.

As used herein, "toner particles" are particles of one or more material(s) that are transferred by an electrophotographic (EP) printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles typically have a range of diameters (e.g., less than 8 µm, on the order of 10-15 µm, up to approximately 30 µm, or larger), where "diameter" preferably refers to the volume-weighted median diameter, as determined by a device such as a Coulter Multisizer.

"Toner" refers to a material or mixture that contains toner particles, and that can be used to form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base.

As mentioned already, toner includes toner particles; it can also include other types of particles. The particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remanence, florescence, resistance to etchants, and other properties of additives known in the art.

In single-component or mono-component development systems, "developer" refers to toner alone. In these systems, none, some, or all of the particles in the toner can themselves be magnetic. However, developer in a mono-component system does not include magnetic carrier particles. In dual-component, two-component, or multi-component development systems, "developer" refers to a mixture including toner particles and magnetic carrier particles, which can be electrically-conductive or -non-conductive. Toner particles can be magnetic or non-magnetic. The carrier particles can be larger than the toner particles (e.g., 15-20 µm or 20-300 µm in diameter). A magnetic field is used to move the developer in these systems by exerting a force on the magnetic carrier particles. The developer is moved into proximity with an imaging member or transfer member by the magnetic field, and the toner or toner particles in the developer are transferred from the developer to the member by an electric field, as will be described further below. The magnetic carrier particles are not intentionally deposited on the member by action of the electric field; only the toner is intentionally deposited. However, magnetic carrier particles, and other particles in the toner or developer, can be unintentionally transferred to an imaging member. Developer can include other additives known in the art, such as those listed above for toner. Toner and carrier particles can be substantially spherical or non-spherical.

The electrophotographic process can be embodied in devices including printers, copiers, scanners, and facsimiles, and analog or digital devices, all of which are referred to herein as "printers." Various embodiments described herein are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields). The present invention can be practiced using any type of electrographic printing system, including electrophotographic and ionographic printers.

A digital reproduction printing system ("printer") typically includes a digital front-end processor (DFE), a print engine (also referred to in the art as a "marking engine") for applying toner to the receiver, and one or more post-printing finishing system(s) (e.g., a UV coating system, a glosser system, or a laminator system). A printer can reproduce pleasing black-and-white or color images onto a receiver. A printer can also produce selected patterns of toner on a receiver, which patterns (e.g., surface textures) do not correspond directly to a visible image.

In an embodiment of an electrophotographic modular printing machine useful with various embodiments (e.g., the NEXFINITY Digital Press manufactured by Eastman Kodak Company of Rochester, N.Y.) color-toner print images are made in a plurality of color imaging modules arranged in tandem, and the print images are successively electrostatically transferred to a receiver adhered to a transport web moving through the modules. Colored toners include colorants, (e.g., dyes or pigments) which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. The provision of a clear-toner overcoat to a color print is desirable for providing features such as protecting the print from fingerprints, reducing certain visual artifacts or providing desired texture or surface finish characteristics. Clear toner uses particles that are similar to the toner particles of the color development stations but without colored material (e.g., dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

Figure 2:
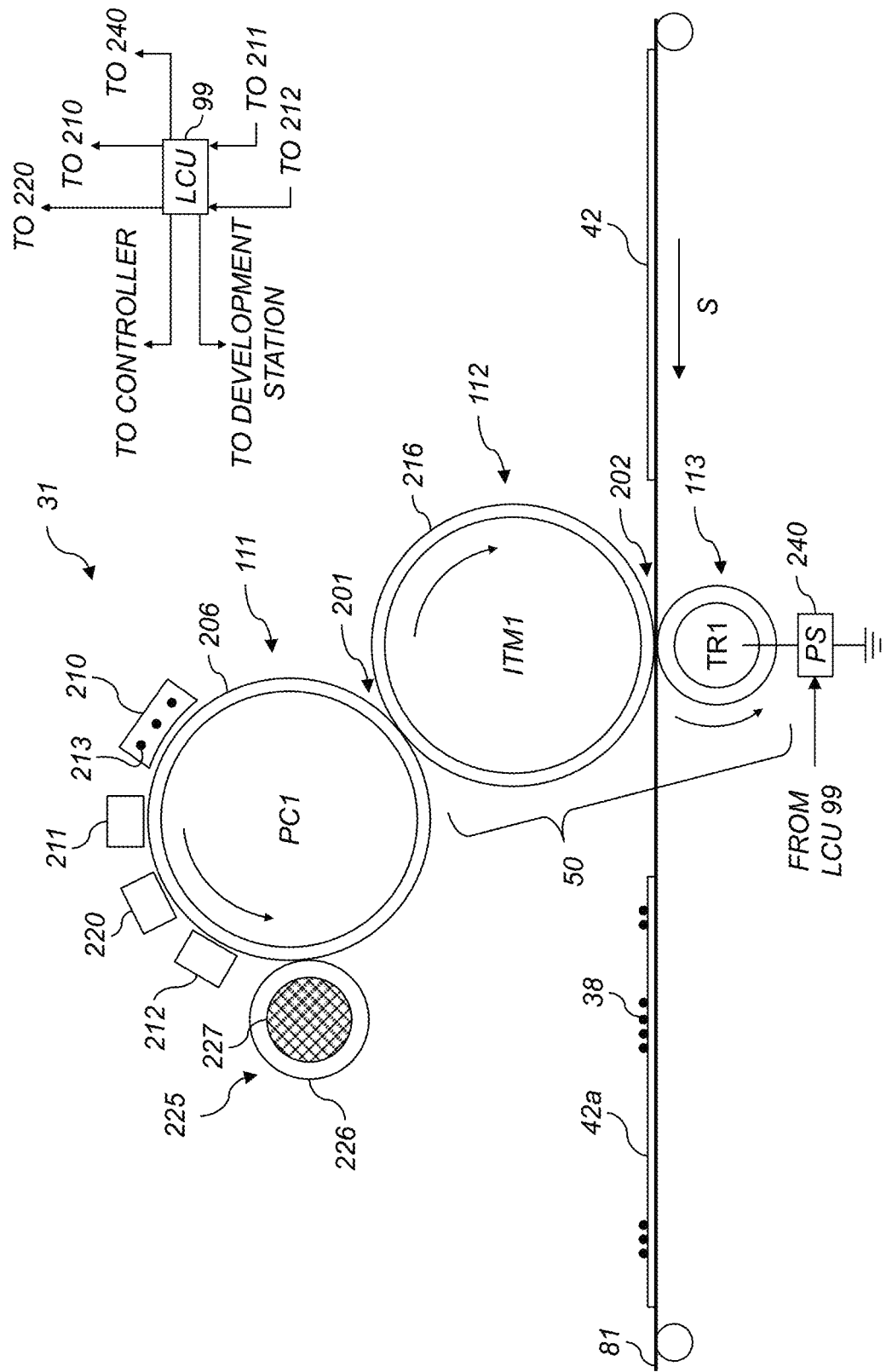
FIG. 2 is an elevational cross-section of one printing module of the electrophotographic printer of FIG. 1.

FIGS. 1 and 2 are elevational cross-sections showing portions of a typical electrophotographic printer 100 useful with various embodiments. Printer 100 is adapted to produce images, such as single-color images (i.e., monochrome images), or multicolor images such as CMYK, or pentachrome (five-color) images, on a receiver. Multicolor images are also known as "multi-component" images. One embodiment involves printing using an electrophotographic print engine having five sets of single-color image-producing or image-printing stations or modules arranged in tandem, but more or less than five colors can be combined on a single receiver. Other electrophotographic writers or printer apparatus can also be included. Various components of printer 100 are shown as rollers; other configurations are also possible, including belts. Referring to FIG. 1, printer 100 is an electrophotographic printing apparatus having a number of tandemly-arranged electrophotographic image-forming printing subsystems 31, 32, 33, 34, 35, also known as electrophotographic imaging subsystems. Each printing subsystem 31, 32, 33, 34, 35 produces a single-color toner image for transfer using a respective transfer subsystem 50 (for clarity, only one is labeled) to a receiver 42 successively moved through the modules. In some embodiments one or more of the printing subsystem 31, 32, 33, 34, 35 can print a colorless toner image, which can be used to provide a protective overcoat or tactile image features. Receiver 42 is transported from supply unit 40, which can include active feeding subsystems as known in the art, into printer 100 using a transport web 81. In various embodiments, the visible image can be transferred directly from an imaging roller to a receiver, or from an imaging roller to one or more transfer roller(s) or belt(s) in sequence in transfer subsystem 50, and then to receiver 42. Receiver 42 is, for example, a selected section of a web or a cut sheet of a planar receiver media such as paper or transparency film.

In the illustrated embodiments, each receiver 42 can have up to five single-color toner images transferred in registration thereon during a single pass through the five printing subsystems 31, 32, 33, 34, 35 to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an exemplary embodiment, printing subsystem 31 forms black (K) print images, printing subsystem 32 forms yellow (Y) print images, printing subsystem 33 forms magenta (M) print images, and printing subsystem 34 forms cyan (C) print images.

Printing subsystem 35 can form a red, blue, green, or other fifth print image, including an image formed from a clear toner (e.g., one lacking pigment). The four subtractive primary colors, cyan, magenta, yellow, and black, can be combined in various combinations of subsets thereof to form a representative spectrum of colors. The color gamut of a printer (i.e., the range of colors that can be produced by the printer) is dependent upon the materials used and the process used for forming the colors. The fifth color can therefore be added to improve the color gamut. In addition to adding to the color gamut, the fifth color can also be a specialty color toner or spot color, such as for making proprietary logos or colors that cannot be produced with only CMYK colors (e.g., metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42*a* is shown after passing through printing subsystem 31. Print image 38 on receiver 42*a* includes unfused toner particles. Subsequent to transfer of the respective print images, overlaid in registration, one from each of the respective printing subsystems 31, 32, 33, 34, 35, receiver 42*a* is advanced to a fuser module 60 (i.e., a fusing or fixing assembly) to fuse the print image 38 to the receiver 42*a*. Transport web 81 transports the print-image-carrying receivers to the fuser module 60, which fixes the toner particles to the respective receivers, generally by the application of heat and pressure. The receivers are serially detacked from the transport web 81 to permit them to feed cleanly into the fuser module 60. The transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along the transport web 81 before or after cleaning station 86 in the direction of rotation of transport web 81.

In the illustrated embodiment, the fuser module 60 includes a heated fusing roller 62 and an opposing pressure roller 64 that form a fusing nip 66 therebetween. In an embodiment, fuser module 60 also includes a release fluid application substation 68 that applies release fluid, e.g., silicone oil, to fusing roller 62. Alternatively, wax-containing toner can be used without applying release fluid to the fusing roller 62. Other embodiments of fusers, both contact and non-contact, can be employed. For example, solvent fixing uses solvents to soften the toner particles so they bond with the receiver. Photoflash fusing uses short bursts of high-frequency electromagnetic radiation (e.g., ultraviolet light) to melt the toner. Radiant fixing uses lower-frequency electromagnetic radiation (e.g., infrared light) to more slowly melt the toner. Microwave fixing uses electromagnetic radiation in the microwave range to heat the receivers (primarily), thereby causing the toner particles to melt by heat conduction, so that the toner is fixed to the receiver.

The fused receivers (e.g., receiver 42b carrying fused image 39) are transported in series from the fuser module 60 along a path either to an output tray 69, or back to printing subsystems 31, 32, 33, 34, 35 to form an image on the backside of the receiver (i.e., to form a duplex print). Receivers 42b can also be transported to any suitable output accessory. For example, an auxiliary fuser or glossing assembly can provide a clear-toner overcoat. Printer 100 can also include multiple fuser modules 60 to support applications such as overprinting, as known in the art.

In various embodiments, between the fuser module 60 and the output tray 69, receiver 42b passes through a finisher 70. Finisher 70 performs various paper-handling operations, such as folding, stapling, saddle-stitching, collating, and binding.

Printer 100 includes main printer apparatus logic and control unit (LCU) 99, which receives input signals from various sensors associated with printer 100 and sends control signals to various components of printer 100. LCU 99 can include a microprocessor incorporating suitable look-up tables and control software executable by the LCU 99. It can also include a field-programmable gate array (FPGA), programmable logic device (PLD), programmable logic controller (PLC) (with a program in, e.g., ladder logic), microcontroller, or other digital control system. LCU 99 can include memory for storing control software and data. In some embodiments, sensors associated with the fuser module 60 provide appropriate signals to the LCU 99. In response to the sensor signals, the LCU 99 issues command and control signals that adjust the heat or pressure within fusing nip 66 and other operating parameters of fuser module 60. This permits printer 100 to print on receivers of various thicknesses and surface finishes, such as glossy or matte.

FIG. 2 shows additional details of printing subsystem 31, which is representative of printing subsystems 32, 33, 34, and 35 (FIG. 1). Photoreceptor 206 of imaging member 111 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 206 is part of, or disposed over, the surface of imaging member 111, which can be a plate, drum, or belt. Photoreceptors can include a homogeneous layer of a single material such as vitreous selenium or a composite layer containing a photoconductor and another material. Photoreceptors 206 can also contain multiple layers.

Charging subsystem 210 applies a uniform electrostatic charge to photoreceptor 206 of imaging member 111. In an exemplary embodiment, charging subsystem 210 includes a wire grid 213 having a selected voltage. Additional necessary components provided for control can be assembled about the various process elements of the respective printing subsystems. Meter 211 measures the uniform electrostatic charge provided by charging subsystem 210.

An exposure subsystem 220 is provided for selectively modulating the uniform electrostatic charge on photoreceptor 206 in an image-wise fashion by exposing photoreceptor 206 to electromagnetic radiation to form a latent electrostatic image. The uniformly-charged photoreceptor 206 is typically exposed to actinic radiation provided by selectively activating particular light sources in an LED array or a laser device outputting light directed onto photoreceptor 206. In embodiments using laser devices, a rotating polygon (not shown) is sometimes used to scan one or more laser beam(s) across the photoreceptor in the fast-scan direction. One pixel site is exposed at a time, and the intensity or duty cycle of the laser beam is varied at each dot site. In embodiments using an LED array, the array can include a plurality of LEDs arranged next to each other in a linear array extending in a cross-track direction such that all dot sites in one row of dot sites on the photoreceptor can be selectively exposed simultaneously, and the intensity or duty cycle of each LED can be varied within a line exposure time to expose each pixel site in the row during that line exposure time.

As used herein, an "engine pixel" is the smallest addressable unit on photoreceptor 206 which the exposure subsystem 220 (e.g., the laser or the LED) can expose with a selected exposure different from the exposure of another engine pixel. Engine pixels can overlap (e.g., to increase addressability in the slow-scan direction). Each engine pixel has a corresponding engine pixel location, and the exposure applied to the engine pixel location is described by an engine pixel level.

The exposure subsystem 220 can be a write-white or write-black system. In a write-white or "charged-area-development" system, the exposure dissipates charge on areas of photoreceptor 206 to which toner should not adhere. Toner particles are charged to be attracted to the charge remaining on photoreceptor 206. The exposed areas therefore correspond to white areas of a printed page. In a write-black or "discharged-area development" system, the toner is charged to be attracted to a bias voltage applied to photoreceptor 206 and repelled from the charge on photoreceptor 206. Therefore, toner adheres to areas where the charge on photoreceptor 206 has been dissipated by exposure. The exposed areas therefore correspond to black areas of a printed page.

In the illustrated embodiment, meter 212 is provided to measure the post-exposure surface potential within a patch area of a latent image formed from time to time in a non-image area on photoreceptor 206. Other meters and components can also be included (not shown).

A development station 225 includes toning shell 226, which can be rotating or stationary, for applying toner of a selected color to the latent image on photoreceptor 206 to produce a developed image on photoreceptor 206 corresponding to the color of toner deposited at this printing subsystem 31. Development station 225 is electrically biased by a suitable respective voltage to develop the respective latent image, which voltage can be supplied by a power supply (not shown). Developer is provided to toning shell 226 by a supply system (not shown) such as a supply roller, auger, or belt. Toner is transferred by electrostatic forces from development station 225 to photoreceptor 206. These forces can include Coulombic forces between charged toner particles and the charged electrostatic latent image, and Lorentz forces on the charged toner particles due to the electric field produced by the bias voltages.

In some embodiments, the development station 225 employs a two-component developer that includes toner particles and magnetic carrier particles. The exemplary development station 225 includes a magnetic core 227 to cause the magnetic carrier particles near toning shell 226 to form a "magnetic brush," as known in the electrophotographic art. Magnetic core 227 can be stationary or rotating, and can rotate with a speed and direction the same as or different than the speed and direction of toning shell 226. Magnetic core 227 can be cylindrical or non-cylindrical, and can include a single magnet or a plurality of magnets or magnetic poles disposed around the circumference of magnetic core 227. Alternatively, magnetic core 227 can include an array of solenoids driven to provide a magnetic field of alternating direction. Magnetic core 227 preferably provides a magnetic field of varying magnitude and direction around the outer circumference of toning shell 226. Development station 225 can also employ a mono-component developer comprising toner, either magnetic or non-magnetic, without separate magnetic carrier particles.

Transfer subsystem 50 includes transfer backup member 113, and intermediate transfer member 112 for transferring the respective print image from photoreceptor 206 of imaging member 111 through a first transfer nip 201 to surface 216 of intermediate transfer member 112, and thence to a receiver 42 which receives respective toned print images 38 from each printing subsystem in superposition to form a composite image thereon. The print image 38 is, for example, a separation of one color, such as cyan. Receiver 42 is transported by transport web 81. Transfer to a receiver is effected by an electrical field provided to transfer backup member 113 by power source 240, which is controlled by LCU 99. Receiver 42 can be any object or surface onto which toner can be transferred from imaging member 111 by application of the electric field. In this example, receiver 42 is shown prior to entry into a second transfer nip 202, and receiver 42a is shown subsequent to transfer of the print image 38 onto receiver 42a.

In the illustrated embodiment, the toner image is transferred from the photoreceptor 206 to the intermediate transfer member 112, and from there to the receiver 42. Registration of the separate toner images is achieved by registering the separate toner images on the receiver 42, as is done with the NexPress 2100. In some embodiments, a single transfer member is used to sequentially transfer toner images from each color channel to the receiver 42. In other embodiments, the separate toner images can be transferred in register directly from the photoreceptor 206 in the respective printing subsystem 31, 32, 33, 34, 25 to the receiver 42 without using a transfer member. Either transfer process is suitable when practicing this invention. An alternative method of transferring toner images involves transferring the separate toner images, in register, to a transfer member and then transferring the registered image to a receiver.

LCU 99 sends control signals to the charging subsystem 210, the exposure subsystem 220, and the respective development station 225 of each printing subsystem 31, 32, 33, 34, 35 (FIG. 1), among other components. Each printing subsystem can also have its own respective controller (not shown) coupled to LCU 99.

Various finishing systems can be used to apply features such as protection, glossing, or binding to the printed images. The finishing system scan be implemented as an integral components of the printer 100, or can include one or more separate machines through which the printed images are fed after they are printed.

Figure 3:
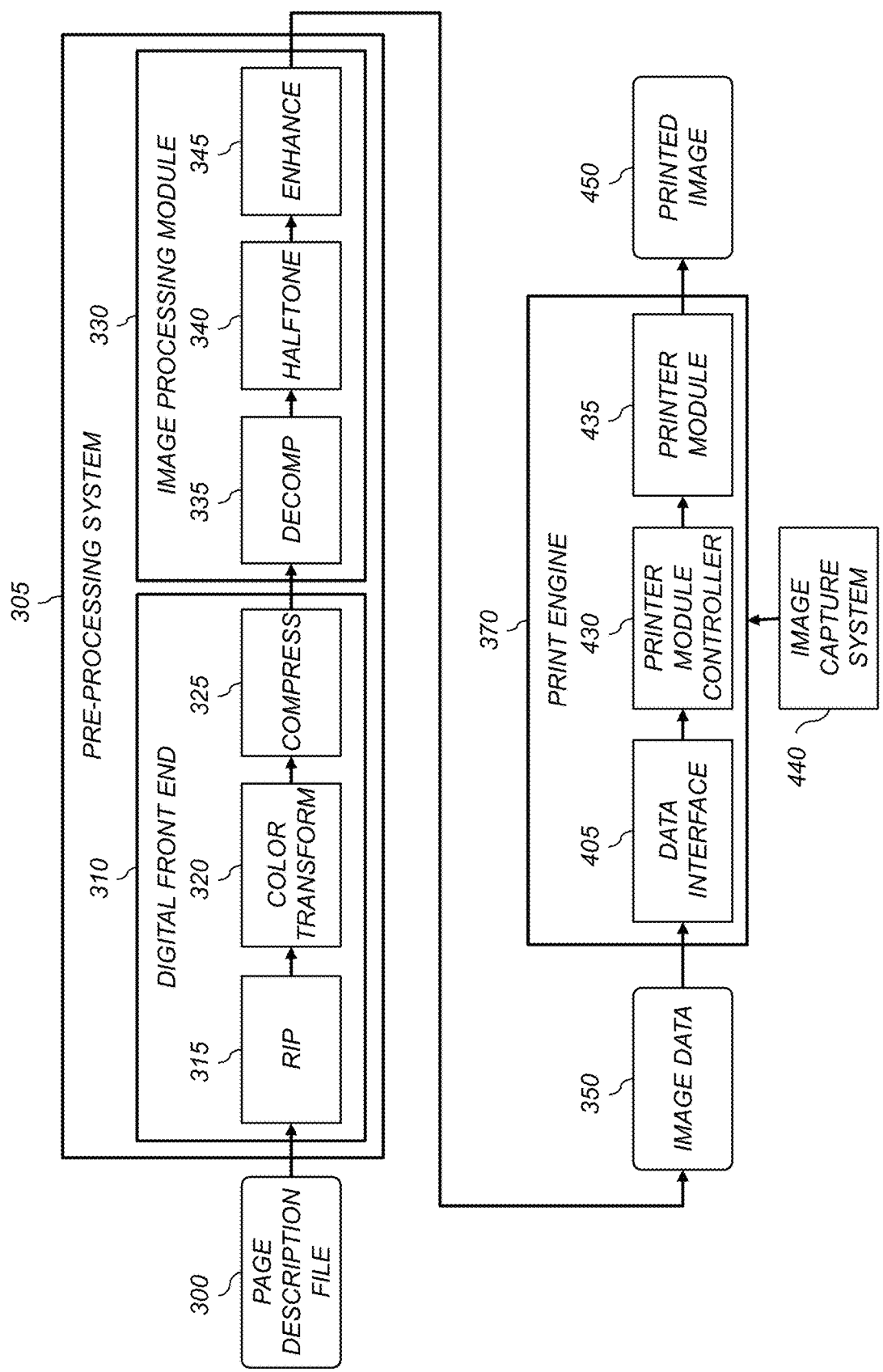
FIG. 3 shows a processing path for producing a printed image using a pre-processing system coupled to a print engine.

FIG. 3 shows a processing path that can be used to produce a printed image 450 with a print engine 370 in accordance with embodiments of the invention. A pre-processing system 305 is used to process a page description file 300 to provide image data 350 that is in a form that is ready to be printed by the print engine 370. In an exemplary configuration, the pre-processing system 305 includes a digital front end (DFE) 310 and an image processing module 330. The pre-processing system 305 can be a part of printer 100 (FIG. 1), or may be a separate system which is remote from the printer 100. The DFE 310 and an image processing module 330 can each include one or more suitably-programmed computer or logic devices adapted to perform operations appropriate to provide the image data 350.

The DFE 310 receives page description files 300 which define the pages that are to be printed. The page description files 300 can be in any appropriate format (e.g., the well-known Postscript command file format or the PDF file format) that specifies the content of a page in terms of text, graphics and image objects. The image objects are typically provided by input devices such as scanners, digital cameras or computer generated graphics systems. The page description file 300 can also specify invisible content such as specifications of texture, gloss or protective coating patterns.

The DFE 310 rasterizes the page description file 300 into image bitmaps for the print engine to print. The DFE 310 can include various processors, such as a raster image processor (RIP) 315, a color transform processor 320 and a compression processor 325. It can also include other processors not shown in FIG. 3, such as an image positioning processor or an image storage processor. In some embodiments, the DFE 310 enables a human operator to set up parameters such as layout, font, color, media type or post-finishing options.

The RIP 315 rasterizes the objects in the page description file 300 into an image bitmap including an array of image pixels at an image resolution that is appropriate for the print engine 370. For text or graphics objects the RIP 315 will create the image bitmap based on the object definitions. For image objects, the RIP 315 will resample the image data to the desired image resolution.

The color transform processor 320 will transform the image data to the color space required by the print engine 370, providing color separations for each of the color channels (e.g., CMYK). For cases where the print engine 370 includes one or more additional colors (e.g., red, blue, green, gray or clear), the color transform processor 320 will also provide color separations for each of the additional color channels. The objects defined in the page description file 300 can be in any appropriate input color space such as RGB, CIELAB, PCS LAB or CMYK. In some cases, different objects may be defined using different color spaces. The color transform processor 320 applies an appropriate color transform to convert the objects to the device-dependent color space of the print engine 370. Methods for creating such color transforms are well-known in the color management art, and any such method can be used in accordance with the present invention. Typically, the color transforms are defined using color management profiles that include multi-dimensional look-up tables. Input color profiles are used to define a relationship between the input color space and a profile connection space (PCS) defined for a color management system (e.g., the well-known ICC PCS associated with the ICC color management system). Output color profiles define a relationship between the PCS and the device-dependent output color space for the printer 100. The color transform processor 320 transforms the image data using the color management profiles. Typically, the output of the color transform processor 320 will be a set of color separations including an array of pixels for each of the color channels of the print engine 370 stored in memory buffers.

The processing applied in digital front end 310 can also include other operations not shown in FIG. 3. For example, in some configurations, the DFE 310 can apply the halo correction process described in commonly-assigned U.S. Pat. No. 9,147,232 to Kuo entitled "Reducing halo artifacts in electrophotographic printing systems," which is incorporated herein by reference.

The image data provided by the digital front end 310 is sent to the image processing module 330 for further processing. In order to reduce the time needed to transmit the image data, a compressor processor 325 is typically used to compress the image data using an appropriate compression algorithm. In some cases, different compression algorithms can be applied to different portions of the image data. For example, a lossy compression algorithm (e.g., the well-known JPEG algorithm) can be applied to portions of the image data including image objects, and a lossless compression algorithm can be applied to portions of the image data including binary text and graphics objects. The compressed image values are then transmitted over a data link to the image processing module 330, where they are decompressed using a decompression processor 335 which applies corresponding decompression algorithms to the compressed image data.

A halftone processor 340 is used to apply a halftoning process to the image data. The halftone processor 340 can apply any appropriate halftoning process known in the art. Within the context of the present disclosure, halftoning processes are applied to a continuous-tone image to provide an image having a halftone dot structure appropriate for printing using the printer module 435. The output of the halftoning can be a binary image or a multi-level image. In an exemplary configuration, the halftone processor 340 applies the halftoning process described in commonly assigned U.S. Pat. No. 7,830,569 to Tai et al., entitled "Multilevel halftone screen and sets thereof," which is incorporated herein by reference. For this halftoning process, a three-dimensional halftone screen is provided that includes a plurality of planes, each corresponding to one or more intensity levels of the input image data. Each plane defines a pattern of output exposure intensity values corresponding to the desired halftone pattern. The halftoned pixel values are multi-level values at the bit depth appropriate for the print engine 370.

The image enhancement processor 345 can apply a variety of image processing operations. For example, an image enhancement processor 345 can be used to apply various image enhancement operations. In some configurations, the image enhancement processor 345 can apply an algorithm that modifies the halftone process in edge regions of the image (see U.S. Pat. No. 7,079,281, entitled "Edge enhancement processor and method with adjustable threshold setting" and U.S. Pat. No. 7,079,287 entitled "Edge enhancement of gray level images," both to Ng et al., and both of which are incorporated herein by reference).

The pre-processing system 305 provides the image data 350 to the print engine 370, where it is printed to provide the printed image 450. The pre-processing system 305 can also provide various signals to the print engine 370 to control the timing at which the image data 350 is printed by the print engine 370. For example, the pre-processing system 305 can signal the print engine 370 to start printing when a sufficient number of lines of image data 350 have been processed and buffered to ensure that the pre-processing system 305 will be capable of keeping up with the rate at which the print engine 370 can print the image data 350.

A data interface 405 in the print engine 370 receives the data from the pre-processing system 305. The data interface 405 can use any type of communication protocol known in the art, such as standard Ethernet network connections. A printer module controller 430 controls the printer module 435 in accordance with the received image data 350. In an exemplary configuration, the printer module 435 can be the printer 100 of FIG. 1, which includes a plurality of individual electrophotographic printing subsystems 31, 32, 33, 34, 35 for each of the color channels. For example, the printer module controller 430 can provide appropriate control signals to activate light sources in the exposure subsystem 220 (FIG. 2) to expose the photoreceptor 206 with an exposure pattern. In some configurations, the printer module controller 430 can apply various image enhancement operations to the image data. For example, an algorithm can be applied to compensate for various sources of non-uniformity in the printer 100 (e.g., streaks formed in the charging subsystem 210, the exposure subsystem 220, the development station 225 or the fuser module 60). One such compensation algorithm is described in commonly-assigned U.S. Pat. No. 8,824,907 to Kuo et al., entitled "Electrophotographic printing with column-dependent tonescale adjustment," which is incorporated herein by reference.

In some cases, the printing system can also include an image capture system 440. The image capture system can be used for purposes such as system calibration. The image capture system 440 can use any appropriate image capture technology such as a digital scanner system, or a digital camera system. The image capture system 440 can be integrated into the printing system, or can be a separate system which is in communication with the printing system.

In the configuration of FIG. 3, the pre-processing system 305 is tightly coupled to the print engine 370 in that it supplies image data 350 in a state which is matched to the printer resolution and the halftoning state required for the printer module 435. In other configurations, the print engine can be designed to be adaptive to the characteristics of different pre-processing systems 305 as is described in commonly-assigned, co-pending U.S. Pat. No. 10,062,017 to Kuo et al., entitled "Print engine with adaptive processing," which is incorporated herein by reference.

As discussed earlier, the color transform processor 320 (FIG. 3) will transform the image data to the color space required by the print engine 370, providing color separations for each of the color channels (e.g., CMYK). The objects defined in the page description file 300 can include raster image data in any appropriate input color space such as RGB, CIELAB, PCS LAB or CMYK. In some cases, the page description file 300 can also include objects (e.g., graphics and text) specified as a named "spot color." Such spot colors can be used to identify the colors to be used for content such as the company logos and product packaging. Examples of systems for naming spot colors would include the well-known Pantone Matching System, which is a proprietary color naming system for identifying colors used in graphic design. Other color naming systems include the RAL Color System, the Toyo Color Finder System and the DIC Color System. In other cases, a spot color can be identified using another named color system, or by simply specifying a color in a device-independent color space (e.g., CIELAB). When a spot color is specified using a color naming system, device-independent color values (e.g., CIELAB values) can be measured and stored in a look-up table for each of the named spot colors in the color naming system. Device independent color values can then be determined for any objects specified by named spot colors by looking up the associated color values in the look-up table.

The CIELAB color space is one of the most commonly used device-independent color spaces that is used for representing colors in color printing applications. A color space is said to be "device-independent" when it is tied to the color perceived by a human observer rather than to the device coordinates of an imaging device (e.g., RGB or CMYK). As is well-known in the art, the perception of a color by a human observer can be characterized by the CIE XYZ tristimulus values:

$$X=\int_\lambda R(\lambda)I(\lambda))\bar{x}(\lambda)d\lambda,$$
$$Y=\int_\lambda R(\lambda)I(\lambda))\bar{y}(\lambda)d\lambda \quad (1)$$
$$Z=\int_\lambda R(\lambda)I(\lambda))\bar{z}(\lambda)d\lambda,$$

where $R(\lambda)$ is the reflection spectrum of the printed color, $I(\lambda)$ is the illumination spectrum, $\bar{x}(\lambda)$, $\bar{y}(\times)$ and $\bar{Z}(\lambda)$ are the CIE color matching functions, and the integration is performed over the visible spectrum, which is approximately $400 \le \lambda \le 700$ nm.

While the CIE XYZ tristimulus values are device-independent, they are not uniformly related to the human perception of color. The CIELAB color space was developed to be a "uniform color space" which implies that geometric distances in the color space should be approximately proportional to perceived color differences. The CIELAB values are represent by three color coordinates L*, a* and b* which can be computed from the tristimulus values using the following equations:

$$L^*=116f(Y/Y_0)-16$$
$$a^*=500(f(X/X_0)-f(X/X_0)) \quad (2)$$
$$b^*=200(f(Y/Y_0)-f(Z/Z_0))$$

where $X_0$, $Y_0$, $Z_0$ are the tristimulus values of a reference white, and $$f(t) = \begin{cases} \sqrt[3]{t}; & \text{if } t > 0.008856 \\ 7.787t + 16/116; & \text{otherwise} \end{cases} \quad (3)$$

Figure 4B:
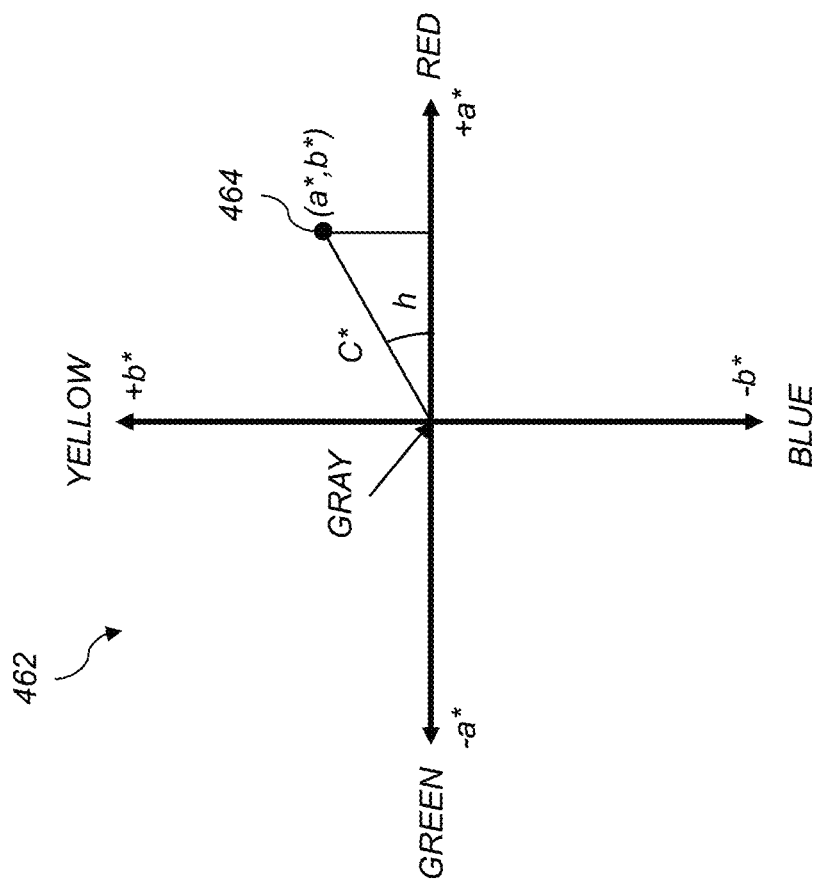
FIGS. 4A-4B illustrate the CIELAB color space.
Figure 4A:
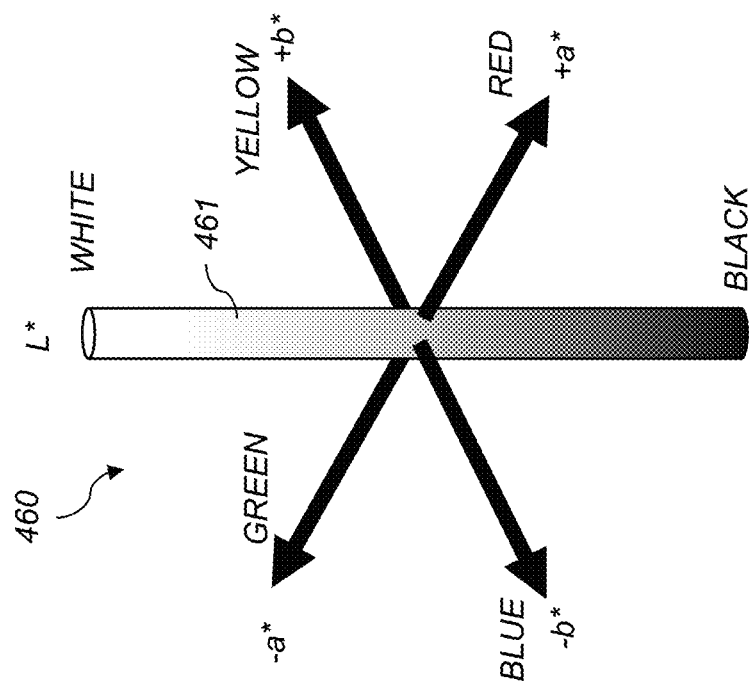

As illustrated in FIG. 4A which shows the CIELAB color space 460, L* is a representation of the lightness of the color, a* is a representation of the greenness-redness of the color, and b* is a representation of the blueness-yellowness of the color. Colors that fall on neutral axis 461 (i.e., colors with a*=b*=0) are neutral colors ranging from black (L*=0) to white (L*=100). As illustrated in FIG. 4B, the hue h of a color can be represented by the angle in the a*-b* plane, and the chroma C* (i.e., the colorfulness) of a color can be represented by the radius in the a*-b* plane. In equation form:

$$C^*=\sqrt{a^{*2}+b^{*2}} \quad (4)$$
$$h=\arctan(b^*/a^*)$$

The perceived color difference $\Delta F^*$ can be approximated by the distance between two colors in the CIELAB color space. In equation form:

$$\Delta F^*=\sqrt{\Delta L^{*2}+\Delta a^{*2}+\Delta b^{*2}} \quad (5)$$

Another device-independent color spaces that can be used in some applications is the well-known CIELUV color space, which represents the color in terms of L*, U* and V* color coordinates. The CIECAM02 color appearance model can also be used to represent color. This model uses more complex models of the human visual system to compute J, a, b color values that correlate with human color appearance. Correlates of hue h and chroma C can also be calculated. A commonly-used derivative is the CAM02 Uniform Color Space (CAM02-UCS), which is an extension of CIECAM02 with tweaks to better match experimental data. Mathematical equations for computing color values in any of these color spaces are well-known to those skilled in the art. It will be obvious that any of these color spaces, as well as any other device-independent color space known in the art, can be used to represent color in accordance with the present invention.

Figure 5:
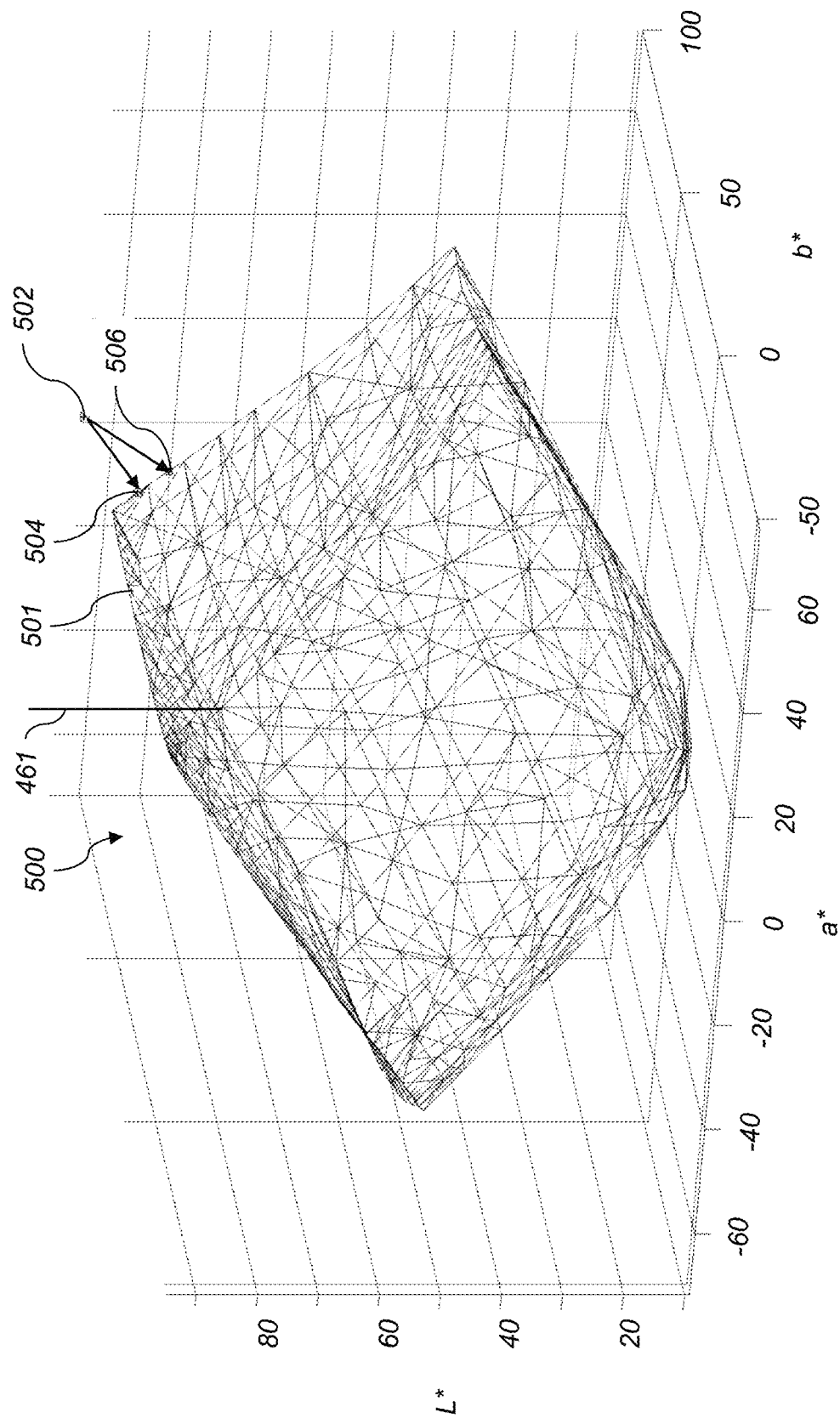
FIG. 5 shows an exemplary spot color which is outside the color gamut of a printing device.

Many commonly used spot colors are outside of the color gamut of typical printing systems that utilize CMYK colorants. The color gamut refers to the set of colors that are reproducible by a printing system, and can be defined by a volume in a three-dimensional device-independent color space such as CIELAB. The color gamut of a printing system will be a function of the colorants, the receiver media and the print mode. The outer surface of the color gamut represents the limiting colors that can be reproduced by the printing system and can be referred to as the gamut surface. The color gamut of a printing system is commonly represented by storing a representation of the gamut surface, for example as a three-dimensional object model defined by a mesh of interconnected points in a device-dependent color space. FIG. 5 shows an example of a typical color gamut 500 represented in the CIELAB color space.

In high-volume printing applications, printing systems can be loaded with specialty colorants (e.g., inks or toners) to accurately reproduce the spot colors. However, this is an impractical solution for low- to mid-volume printing applications since it can be time-consuming and costly to change the colorants in the printing system. In such cases, it is preferable to compromise on the color accuracy and utilize an in-gamut color that can be printed using the standard colorant even though it is necessary to compromise on the color accuracy. The problem then is to determine the in-gamut color that most closely matches the desired appearance of the spot color. However, this is not a straight-forward problem to solve given the complex shape of device color gamuts and the subjective preferences of human observers.

An example spot color 502 is illustrated in FIG. 5, which falls outside the color gamut 500 of the printing system. In this example, the spot color 502 is a yellow color having a large b* value and a small a* value. In order to reproduce this color using the printing system, it is necessary to map it to a color which is within the reproducible color gamut 500. Typically the chosen color will be a color on the color gamut surface 501. Many "gamut mapping algorithms" exist in the art to perform the mapping of out-of-gamut colors. One such gamut mapping algorithm involves finding the target color 504 which has the minimum color difference (e.g., $\Delta F^*$) to the spot color 502. While the target color 504 may be the closest visual match to the spot color 502, it is frequently not the preferred reproduction of the spot color due to the fact that it can introduce significant hue shifts, particularly when the spot color 502 is near one of the sharp "corners" in the color gamut 500 corresponding to the printer's primary colors (C, M, Y) or secondary colors (R, G, B). These hue shifts are often objectionable to a user. For example, if a user specifies that their logo should be printed with a high-chroma lemon yellow spot color 502, they would usually not want it to be reproduced with a greenish-yellow or orangish-yellow hue, and would instead want to compromise on the lightness and/or the chroma to keep the hue closer to the hue of the spot color 502.

Other types of gamut mapping algorithms preserve the hue of the spot color 502 to avoid the objectionable hue shift problem associated with the minimum $\Delta E^*$ algorithms. One simple algorithm of this type holds the lightness value (L*) and hue value (h) constant and clips the chroma value (C*) to the color gamut surface 501. The often results in the reproduced color having significantly lower chroma than the spot color 502. A more sophisticated hue-preserving gamut mapping algorithm involves finding the color on the color gamut surface 501 having the minimum color difference (e.g., $\Delta F^*$) to the specified spot color 502 subject to the constraint that the hue value is equal to the hue value of the spot color 502. This tends to map the spot color 502 toward the high-chroma edges of the color gamut surface 501. FIG. 5 illustrates a target color 506 determined using a gamut mapping algorithm of this type.

While the hue-preserving target color 506 will preserve the hue of the spot color 502, it will often have a significantly lower chroma than the minimum color difference target color 504. Often, a particular user may not prefer either of these two extremes but will instead prefer to map the spot color 502 to some other location on the color gamut surface 502. And frequently, the preferred color for one user may differ from that chosen by a different user. As a result, it is often necessary for users to perform a time-consuming iterative process to determine the preferred color reproduction for a particular spot color 501. The method commonly involves making repeated adjustments to the target L*a*b* values (or to the printer CMYK values) until the preferred color reproduction is determined. This typically requires a complex search process given the high-dimensionality of the search space.

Figure 6:
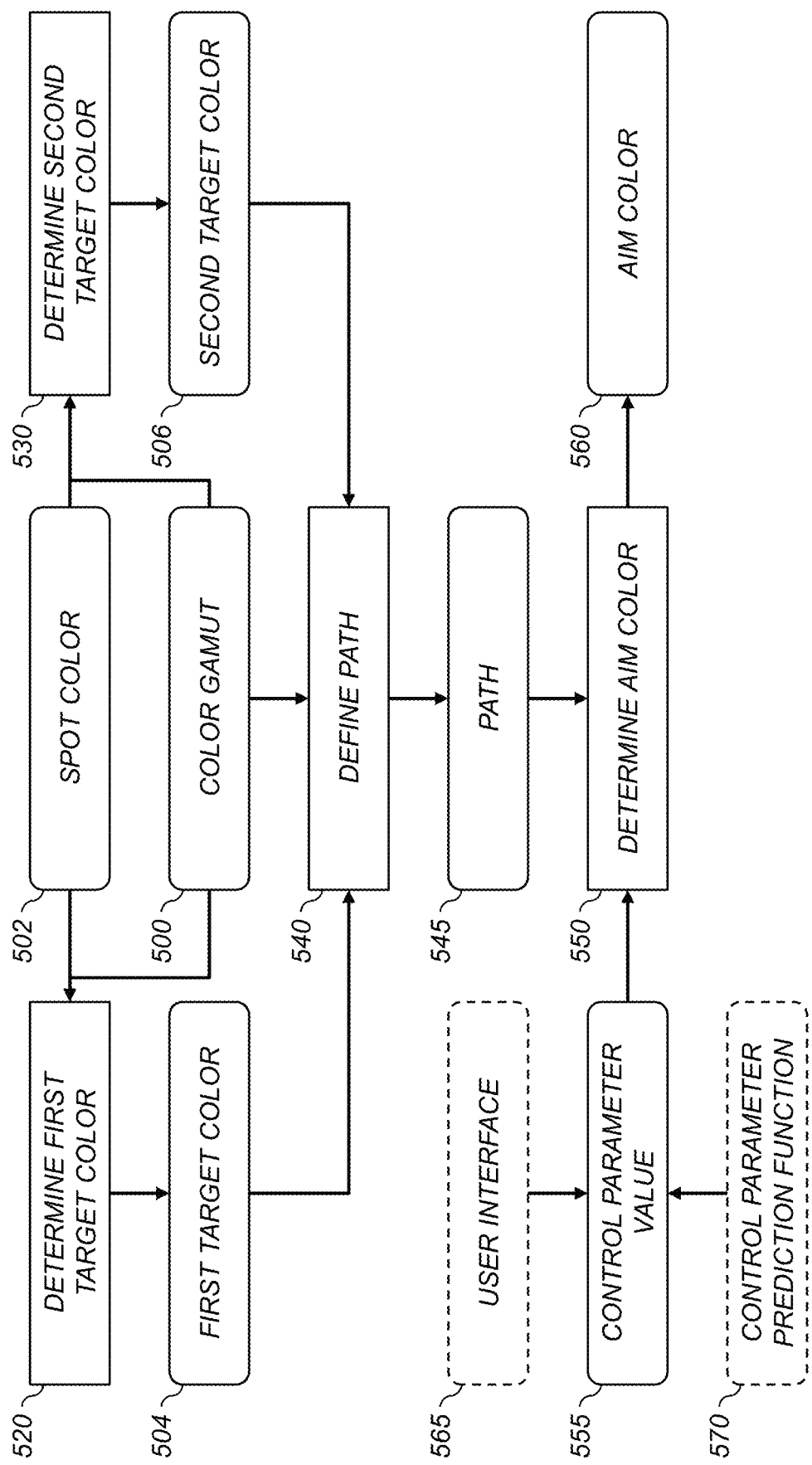
FIG. 6 shows a flowchart for an exemplary method for determining a preferred aim color for reproducing a spot color in accordance with an embodiment of the invention.

The present invention significantly simplifies the process of determining an aim color for reproducing an out-of-gamut spot color by reducing the dimensionality of the search process to provide a one-dimensional control parameter. FIG. 6 shows a flowchart for an exemplary embodiment of the invention. The inputs to the process are a spot color 502 and a color gamut 500

In the following description, the spot color 502 will be referred to as $C_s$ and is specified by color coordinates in a three-dimensional color space such as CIELAB. The color gamut 500 will likewise be referred to as $G_c$, and can be represented by a color gamut surface 501 (FIG. 5) in the three-dimensional color space representing the colors that can be printed by the color printing system, which will be referred to as $\delta G_c$. The color gamut 500 is typically determined by printing color patches that span the range of input code values for the color channels of the color printing system. The color of the printed patches are then measured using a device such as a spectrophotometer or a colorimeter, and a color gamut surface 501 that contains all of the printable colors is determined using a fitting process as is well-known in the art.

If the spot color 502, $C_s$, is inside of the color gamut 500, $G_c$, (i.e., if $C_s \in G_c$), then the spot color 502 can be used directly for the aim color 560, $C_a$, (i.e., $C_a = C_s$). Otherwise, the method of FIG. 6 is used to determine the aim color 560, which will be a function of the spot color 502, $C_s$, and the color gamut 500, $G_c$. In the case, the resulting aim color 560 will preferably be a color on the surface of the color gamut 500 (i.e., $C_a \in \delta G_c$).

A determine first target color step 520 is used to determine a first target color 504, $C_{t1}$. The quantity $C_{t1}$ is a vector in the three-dimensional color space (e.g., $[L^*_{t1}, a^*_{t1}, b^*_{t1}]$). In a preferred embodiment, the determine first target color step 520 determines the first target color 504 by finding the color on the surface of the color gamut 500 having the minimum color difference (e.g., $\Delta E^*$) to the spot color 502. This corresponds to the first target color 504 shown in the example of FIG. 5.

A determine second target color step 530 is used to determine a second target color 506, $C_{t2}$, having a hue value equal to the hue of the spot color 502. The quantity $C_{t2}$ is a vector in the three-dimensional color space (e.g., $[L^*_{t2}, a^*_{t2}, b^*_{t2}]$). In a preferred embodiment, the second target color 506 is the color on the surface of the color gamut 500 having the minimum color difference (e.g., $\Delta E^*$) to the specified spot color 502 subject to the constraint that the hue value is equal to the hue value of the spot color 502. This corresponds to the second target color 506 shown in the example of FIG. 5. In other embodiments, other hue preserving gamut mapping methods can be used to find the second target color 506. For example, the second target color 506 can be found by clipping the chroma of the spot color 502 to the surface of the color gamut 500 while holding the hue and lightness constant.

Figure 7:
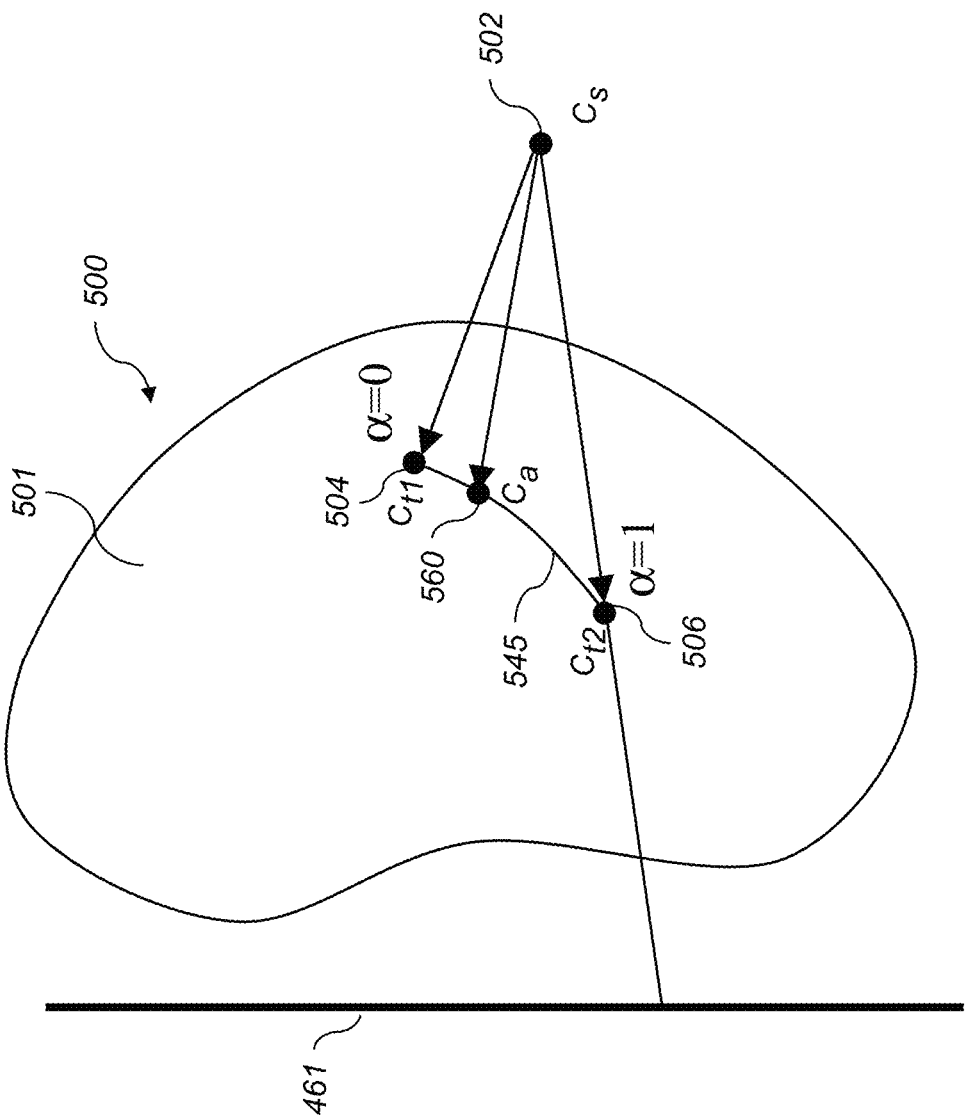
FIG. 7 illustrates a path formed on the color gamut surface between two target colors.

The goal of the invention is to determine a preferred aim color 560 on the surface of the color gamut 500 for reproducing the spot color 502. The generalized optimization problem would involve searching the entire surface of the color gamut 500 in the region near the spot color 502. Since the computational complexity of the optimization process increases exponentially with respect to the dimension of the independent feature space (i.e., the curse of dimensionality), a constraint is introduced which limits the search space to a path 545 specified by a one-dimensional control parameter. In an exemplary embodiment, a define path step 540 is used to define the path 545 along the surface of the color gamut 500 connecting the first target color 504 and the second target color 506 as illustrated in FIG. 7. A control parameter, a, having a control parameter value 555 is used to specify a relative position along the path 545, with $\alpha=0$ corresponding to the first target color 504 and $\alpha=1$ corresponding to the second target color 506. The path 545 represents a limited search space for determining a preferred aim color 560 for reproducing the spot color 502.

The define path step 540 can define the path 545 using a variety of methods. In an exemplary embodiment, the control parameter, a, specifies a hue, $h_\alpha$, using a linear relationship:

$$h_\alpha = h_1 + \alpha(h_2 - h_1) \qquad (6)$$

where $h_1$ is the hue of the first target color 504 and $h_2$ is the hue of the second target color 506. The color $C_\alpha$ at a point along the path 545 corresponding to a particular control parameter value 555 can then be determined by finding the color on the surface of the color gamut 500 having the minimum color difference to the specified spot color 502 subject to the constraint that the hue value is equal to $h_\alpha$.

In another embodiment, the control parameter, a, specifies a relative position along a straight line connecting the first target color 504 and the second target color 506. The color at this position is given by:

$$C_\alpha = C_{t1} + \alpha(C_{t2} - C_{t1}) \qquad (7)$$

The color, $c_\alpha$, does not generally lie on the color gamut surface 501. Therefore, the path color, $C_\alpha$, can then be found by projecting the color $c_\alpha$ onto the color gamut surface 501 (for example at a constant lightness and hue).

A determine aim color step 550 is then used to determine aim color 560 corresponding a control parameter value 555 which specifies a position along the path 545 corresponding to a preferred reproduction of the spot color 502. The control parameter value 555 can be determined using a variety of different methods. In an exemplary embodiment, a user interface 565 is provided which enables a user to adjust the control parameter value 555 to specify a preferred aim color 560.

Figure 8A:
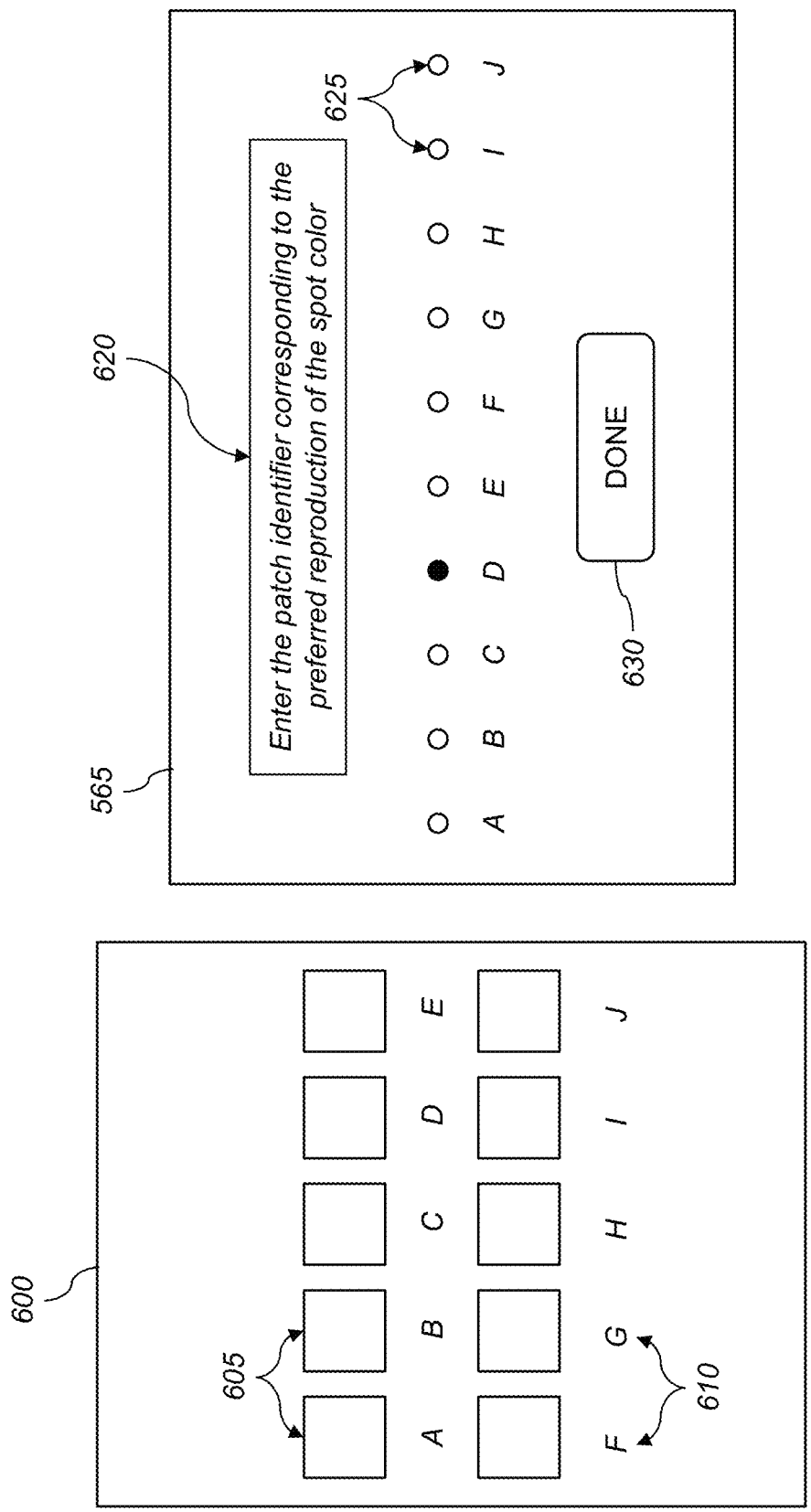
FIGS. 8A-8C illustrate different user interface examples for use with the method of FIG. 6.

In one exemplary embodiment, a test target 600 is printed including a plurality of test patches 605 with sample colors at points along the defined color path corresponding to a plurality of control parameter values as illustrated in FIG. 8A. Patch identifiers 610 are included to label each of the printed test patches 605. A user interface 565 is provided that includes features which enables the user to select one of the test patches 605 to be used as the aim color 560. The exemplary user interface 565 includes user instructions 620, patch selection features 625 (in this example radio buttons), and a done button 630. In this embodiment, the number of test patches 605 should be large enough so that the color difference between the sample colors is relatively small (e.g., about 1-3 $\Delta E^*$).

Figure 8B:
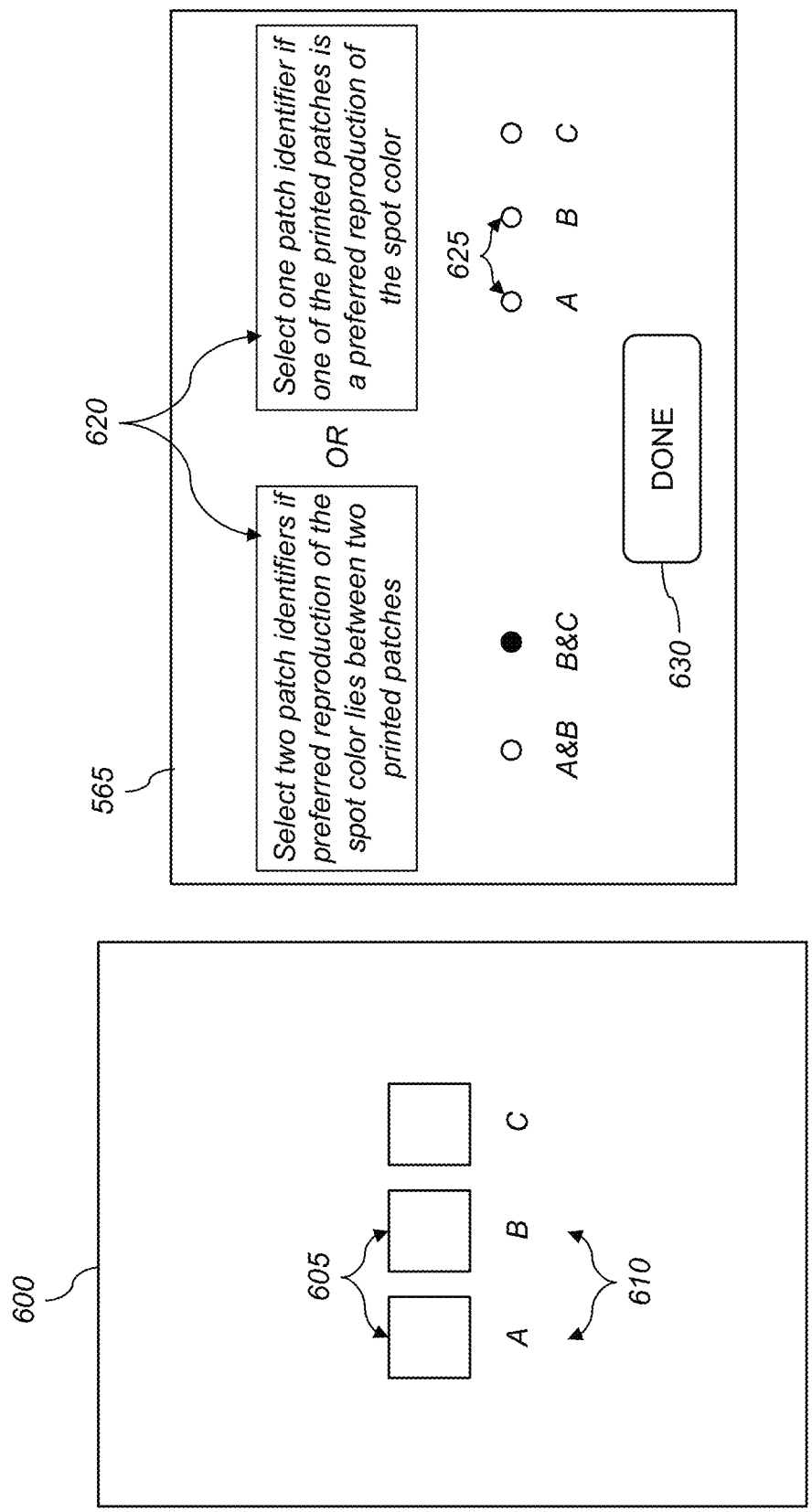

In another exemplary embodiment, the user interface 565 walks the user through an iterative process to select the preferred aim color 560. In a first step, a test target 600 is printed having three or more test patches 605 as shown in FIG. 8B. The first test patch 605 corresponds to the first target color 504 ($\alpha=0$), the last test patch 605 corresponds to the second target color 506 ($\alpha=1$), and the intermediate test patches 605 correspond to one or more intermediate control parameter values. In the illustrated example, a single intermediate test patch 605 is provided having $\alpha=0.5$. A user interface 565 is provided which enables the user to either select one of the printed test patches 605 if the user judges that it represents a preferred reproduction of the spot color 502, or to select two of the printed test patches 605 if the user judges that the preferred reproduction of the spot color 502 falls between them. To enable these features, the user interface 565 includes exemplary user interface 565 includes user instructions 620, patch selection features 625 (in this example radio buttons), and a done button 630.

If the user selects two of the printed test patches 605, another test target 600 is printed having three or more test patches 605, where the first and last test patches 605 correspond to the user selected test patches 605 in the previous iteration, and the intermediate test patches 605 correspond to one or more intermediate control parameter values. For example, if the user selected the test patches 605 corresponding to $\alpha=0$ and $\alpha=0.5$, the new test target would have patches with $\alpha=0$, $\alpha=0.25$ and $\alpha=0.5$. The user then uses the user interface 565 as described above to either select one or two of the printed test patches 605. This process is repeated with increasingly smaller color differences between the printed test patches 605 until the user indicates that one of the printed test patches 605 represents a preferred reproduction of the spot color 502. While the illustrated example includes only a single intermediate test patch 605, it will be obvious that a plurality of intermediate test patches 605 could be used in other embodiments. This would provide smaller color differences between the test patches 605, and would enable the iterative process to converge with fewer iterations.

In some embodiments, the path 545 is comprised of colors that fall within the color gamut of a soft-copy display. In this case, the preferred reproduction of the spot color 502 can be selected based on previews of the reproduced color presented in an appropriate user interface 565 such as that shown in FIG. 8C. In this case, the user interface 565 includes user instructions 620, together with a control feature 635 (e.g., a slide bar) that enables the user to adjust the control parameter, and a color patch 640 which displays a preview of the reproduced color corresponding to the control parameter selected using the control feature 635. A done button 630 is provided to enable the user to indicate that the selection process is complete. This method can be used even if the path 545 includes colors that fall outside the color gamut of a soft-copy display. However, in this case, any out-of-gamut sample colors must be gamut-mapped to a color that can be displayed on the soft-copy display. This is preferably done using a hue-preserving gamut mapping algorithm.

The process of determining the preferred aim color 560 for a particular spot color 502 can be a time-consuming labor-intensive process that must be repeated for each different spot color 502. However, the optimal control parameter value 555 determined for one spot color 502 should be similar to the value that would be determined for other similar spot colors 502. Therefore, to aid in the optimization process a control parameter prediction function 570 can be determined (e.g., using a supervised learning algorithm) based on the values determined for previously evaluated spot colors 502. The inputs to the control parameter prediction function 570 are the device-independent color values for a spot color, and the output of the control parameter prediction function 570 is a corresponding prediction of the optimal control parameter value 555.

Figure 9:
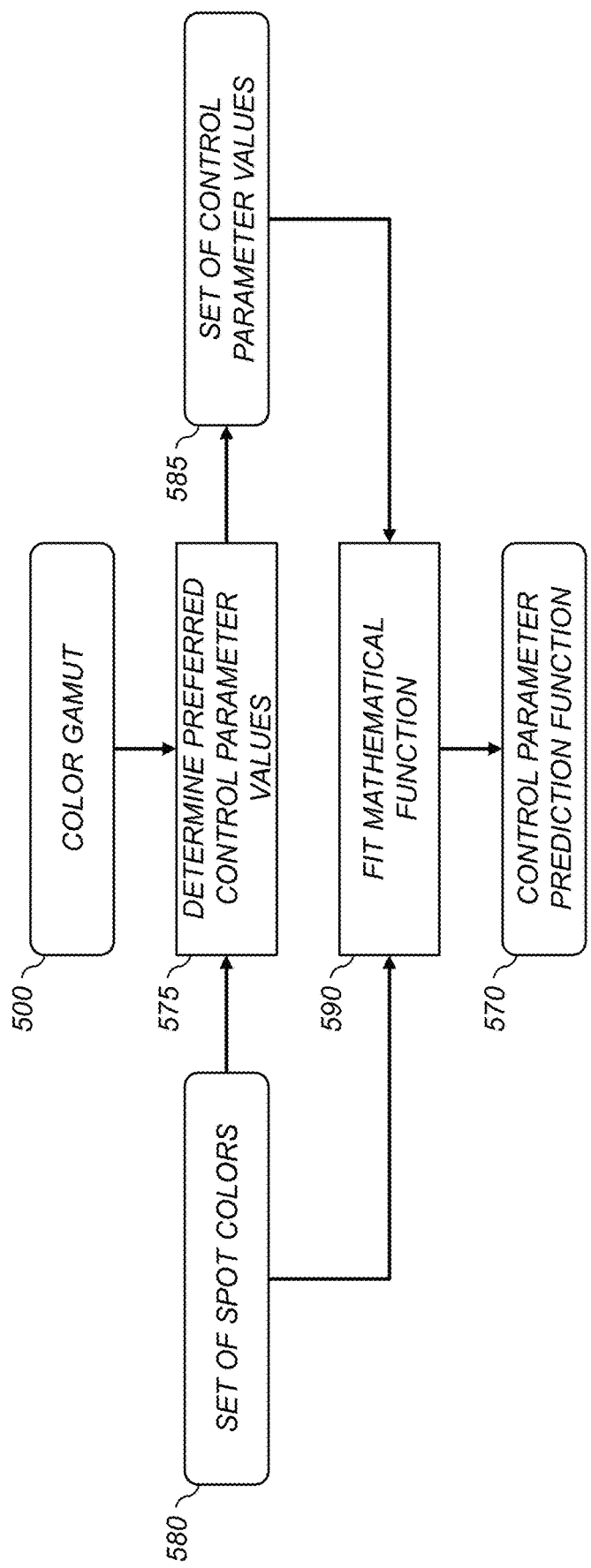
FIG. 9 is a flowchart of a method for determining a control parameter prediction function in accordance with an exemplary embodiment.

FIG. 9 shows a flowchart of an exemplary method for determining the control parameter prediction function 570. A determine preferred control parameters step 575 is used to determine a set of control parameter values 585 corresponding to a set of spot colors 580. The set of spot colors 580 preferably spans all parts of color space that are likely to be encountered in spot colors. In an exemplary embodiment, the determine preferred control parameters step 575 uses the method described with respect to FIG. 6 to determine the control parameter values 555 for each of the spot colors 502 in the set of spot colors 580. A fit mathematical function step 590 is used to fit an appropriate mathematical function to the set of spot colors 580 and the corresponding set of control parameter values 585 to determine the control parameter prediction function 570 having the form:

$$\bar{\alpha} = f_\alpha(c_s) \qquad (8)$$

where $\bar{\alpha}$ is the predicted control parameter value 555, $f_\alpha(\cdot)$ is the control parameter prediction function 570, and $C_s$ is the spot color 502, which will generally be represented by three coordinates (e.g., L*, a*, b*). Any appropriate form of mathematical function can be used for the control parameter prediction function 570. For example, the control parameter prediction function 570 can be a multi-dimensional polynomial function, a spline function, a multi-dimensional LUT, and a neural network function. Preferably, the output of the control parameter prediction function 570 should be constrained to provide predicted control parameter values 555 in the range of $0 \leq \bar{\alpha} \leq 1$. In an exemplary embodiment the control parameter prediction function 570 is a neural network function where the inputs are the color coordinates of the spot color, the substrate and the illumination light source, and the output is the control parameter value.

In some embodiments, the control parameter prediction function 570 can be determined by a particular user to represent the color reproduction preferences of that user. In other embodiments, a set of different users can each determine a set of color parameter values 585 according to their preferences, and the determined sets of color parameter values 585 can be pooled to determine a single control parameter prediction function 570 that is representative of the average preferences.

In some embodiments, each time a user determines a preferred aim color 560 for a new spot color 502 using the method of FIG. 6, the new data can be added to the set of spot colors 580 and the set of control parameter values 585, and an updated control parameter prediction function 570 can be determined using the method of FIG. 9.

Generally, the control parameter prediction function 570 will be a function of the color gamut 500 of the printing system, and therefore different control parameter prediction functions 570 can be determined for each printer configuration (e.g., each set of different colorants, media, print modes, etc.). However, in some cases the control parameter prediction functions 570 may be similar enough that a single control parameter prediction function 570 can be used across at least some of the different configurations. Even when it is desirable to provide different control parameter prediction functions 570 for different printer configurations, it may be appropriate to use the control parameter prediction function 570 for one configuration as an initial guess at the control parameter prediction function 570 for a new configuration. The control parameter prediction function 570 can then be refined as new preferred aim colors are determined.

Once determined, the control parameter prediction function 570 can be used in the method of FIG. 6 to provide an initial guess for the control parameter value 555 that will produce the preferred reproduction of the spot color 502. The initial guess can be used in any of the methods described relative to FIGS. 8A-8C. For example, the predicted control parameter value 555 can be used to create the intermediate test patch 605 in first iteration of the method described relative to FIG. 8B, or can be used as the initial setting of the control feature 635 in the method described relative to FIG. 8C.

Figure 8C:
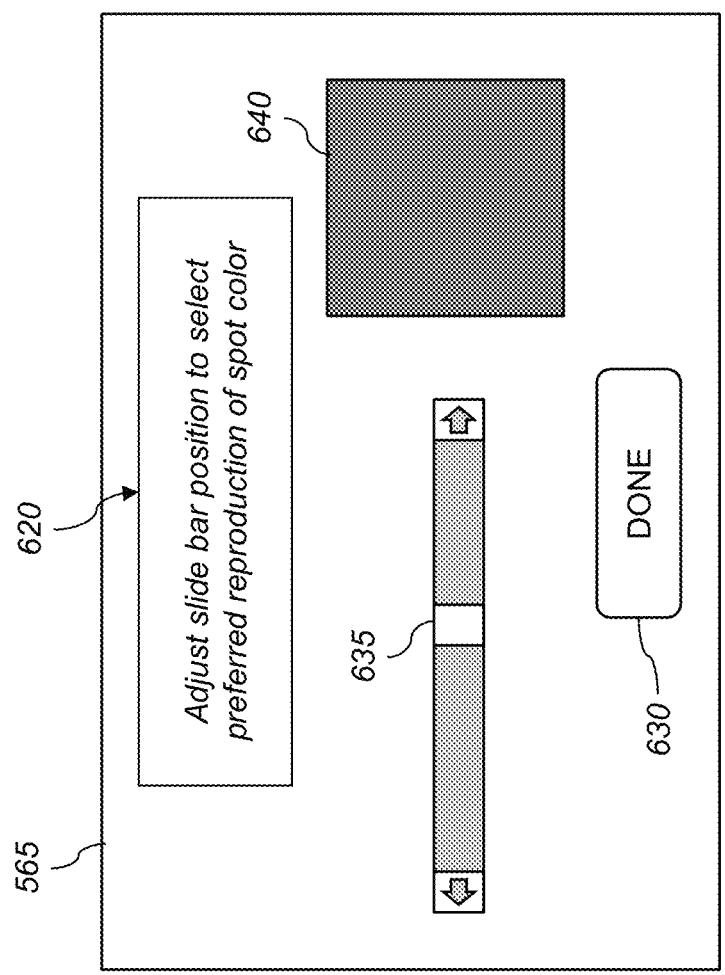

In some cases, the control parameter prediction function 570 can produce adequate reproductions of the spot colors 502 without the need for a user to utilize a manual selection process (such as those described relative to FIGS. 8A-8C). In this case, the control parameter prediction function 570 can be used to automatically determine the preferred aim color 560 for any spot color 502 that comes into the printing system. In some embodiments, the printing system can provide an option to override the automatic aim color selection if a user desires to fine tune the reproduction of a particular spot color 502.

Once the preferred aim color 560 is determined for a spot color 502 specified in an input page description file 300 (FIG. 3), a color transform 320 is used to determine the corresponding device coordinates (e.g., CMYK values) that will produce the preferred aim color 560. For example, in some embodiments the aim color 560 is specified in terms of the CIELAB color space. In this case, the color transform 320 can be an inverse device profile, for example in the format of an ICC profile, which transforms from the CIELAB values to the corresponding CMYK values. Once the device coordinates are determined and used by the pre-processing system 305 to provide the corresponding image data 350, the print engine 370 is used to print the image data 350 to form a corresponding printed image 450, wherein the spot colors 502 in the page description file 300 are reproduced as the preferred aim colors 560.

The invention has been described in detail with particular reference to certain preferred embodiments thereof, but it will be understood that variations, combinations, and modifications can be effected by a person of ordinary skill in the art within the spirit and scope of the invention.

PARTS LIST 31 printing module
32 printing module
33 printing module
34 printing module
35 printing module
38 print image
39 fused image
40 supply unit
42 receiver
42a receiver
42b receiver
50 transfer subsystem
60 fuser module
62 fusing roller
64 pressure roller
66 fusing nip
68 release fluid application substation
69 output tray
70 finisher
81 transport web
86 cleaning station
99 logic and control unit (LCU)
100 printer
111 imaging member
112 intermediate transfer member
113 transfer backup member
201 first transfer nip
202 second transfer nip
206 photoreceptor
210 charging subsystem
211 meter
212 meter
213 grid
216 surface
220 exposure subsystem
225 development station
226 toning shell
227 magnetic core
240 power source
300 page description file
305 pre-processing system
310 digital front end (DFE)
315 raster image processor (RIP)
320 color transform processor
325 compression processor
330 image processing module
335 decompression processor
340 halftone processor
345 image enhancement processor
350 image data
370 print engine
405 data interface
430 printer module controller
435 printer module
440 image capture system
450 printed image
460 CIELAB color space 461 neutral axis
462 a*-b* color plane
464 color coordinate
500 color gamut
501 color gamut surface
502 spot color
504 target color
506 target color
508 neutral axis
520 determine first target color step
530 determine second target color step
540 define path step
545 path
550 determine aim color step
555 control parameter value
560 aim color
565 user interface
570 control parameter prediction function
575 determine preferred control parameter values step
580 set of spot colors
585 set of control parameter values
590 fit mathematical function step
600 test target
605 test patches
610 patch identifiers
620 user instructions
625 patch selection feature
630 done button
635 control feature
640 color patch

The invention claimed is:

1. A method for reproducing an out-of-gamut spot color on a color printer, comprising:
   determining a color gamut for the color printer, the color gamut being defined by a color gamut surface in a three-dimensional color space representing the colors that can be printed by the color printer;
   specifying a spot color by color coordinates in the three-dimensional color space, wherein the spot color is outside of the color gamut surface;
   determining a first target color corresponding to a color on the color gamut surface having a minimum color difference to the specified spot color;
   determining a second target color corresponding to a color on the color gamut surface having a hue value equal to a hue value of the specified spot color;
   defining a path on the color gamut surface connecting the first target color and the second target color, wherein a control parameter having a control parameter value is used to specify a relative position along the defined path; and
   providing a user interface enabling a user to adjust the control parameter to specify an aim color along the defined path for reproducing the spot color using the color printer.

2. The method of claim 1, further including reproducing the spot color by printing the selected aim color using the color printer.

3. The method of claim 1, further including printing sample colors at a plurality of points along the defined color path corresponding to a plurality of control parameter values, and wherein the user interface enables the user to select one of the sample colors to be used as the aim color.

4. The method of claim 1, further including:
   a) printing sample colors at three or more points along the defined color path corresponding to three or more control parameter values;
   b) enabling a user to use the provided user interface to either select one of the printed sample colors to be used as the aim color or to select two of the sample colors that the aim color lies between;
   c) if the user selects two of the sample colors, enabling a printing of one or more additional sample colors along the defined color path corresponding to one or more control parameter values, wherein the one or more additional sample colors are between the two selected sample colors; and
   d) enabling a repeating of steps b) and c) until the user selects one of the printed sample colors to be used as the aim color.

5. The method of claim 1, wherein the user interface is presented on a soft-copy display and includes:
   a user interface control feature enabling the user to specify a control parameter value corresponding to a relative position along the defined path;
   a color patch that displays a preview of a sample color corresponding to the specified control parameter value; and
   a user interface selection feature enabling the user to indicate that the previewed sample color should be used as the aim color.

6. The method of claim 5, wherein if the sample color is inside a color gamut of the soft-copy display the displayed preview of the sample color has the same color as the sample color, and if the sample color is outside the color gamut of the soft-copy display a gamut-mapping algorithm is used to determine a color for the displayed preview of the sample color.

7. The method of claim 1, wherein the user interface includes a user interface control feature enabling the user to specify a control parameter value to select the aim color along the defined path.

8. The method of claim 7, further including providing a control parameter prediction function which predicts a preferred control parameter value as a function of the specified color coordinates of the spot color, and wherein the control parameter prediction function is used to determine an initial position of the user interface control feature.

9. The method of claim 8, wherein the control parameter prediction function is determined by enabling one or more observers to determine preferred control parameter values for a plurality of different spot colors and fitting a mathematical function to the determined preferred control parameter values, wherein inputs to the mathematical function are the color coordinates of the spot color and an output of the mathematical function is the predicted control parameter.

10. The method of claim 1, wherein the control parameter specifies a hue value between a first hue value corresponding to the first target color and a second hue value corresponding to the second target color, and wherein a lightness value and a chroma value corresponding to a specified hue value are determined by finding a color on the color gamut surface having a minimum color difference to the specified spot color subject to the constraint that a hue value of the color is equal to the specified hue value.

11. The method of claim 1, wherein the control parameter specifies an interpolated color between the first target color and the second target color, wherein a color on the defined path corresponding to a particular control parameter is determined by projecting the interpolated color onto the color gamut surface at a constant hue and lightness.

12. The method of claim 1, wherein a lightness value and a chroma value for the second target color are determined by finding a color on the color gamut surface having a minimum color difference to the specified spot color subject to the constraint that the hue value is equal to the hue value of the specified spot color.

13. The method of claim 1, wherein the second target color has a lightness value equal to the specified spot color.

14. The method of claim 1, wherein the three-dimensional color space is CIELAB or CIECAM02 or CAM02-UCS.

15. The method of claim 1, wherein the color difference corresponds to a distance in the three-dimensional color space.

16. A method for reproducing an out-of-gamut spot color on a color printer, comprising:

determining a color gamut for the color printer, the color gamut being defined by a color gamut surface in a three-dimensional color space representing the colors that can be printed by the color printer;

specifying a spot color by color coordinates in the three-dimensional color space, wherein the spot color is outside of the color gamut surface;

determining a first target color corresponding to a color on the color gamut surface having a minimum color difference to the specified spot color;

determining a second target color corresponding to a color on the color gamut surface having a hue value equal to a hue value of the specified spot color;

defining a path on the gamut surface connecting the first target color and the second target color, wherein a control parameter having a control parameter value is used to specify a relative position along the defined path; and adjusting the control parameter to specify an aim color along the defined path for reproducing the spot color using the color printer.

\* \* \* \* \*